US010746210B2

(12) United States Patent
David et al.

(10) Patent No.: US 10,746,210 B2
(45) Date of Patent: Aug. 18, 2020

(54) ASSEMBLY WITH GUIDANCE OF AN ELONGATE THIN LIP IN AN ELONGATE NARROW SLOT AND APPLICATION TO THE ASSEMBLING OF AN AIR GUIDE ON A NOZZLE

(71) Applicant: RENAULT s.a.s., Boulogne Billancourt (FR)

(72) Inventors: Pascal David, Voisin le Bretonneux (FR); Joseph Bui, Les Mureaux (FR)

(73) Assignee: RENAULT s.a.s., Boulogne Billancourt (FR)

( * ) Notice: Subject to any disclaimer, the term of this patent is extended or adjusted under 35 U.S.C. 154(b) by 831 days.

(21) Appl. No.: 15/039,718

(22) PCT Filed: Sep. 30, 2014

(86) PCT No.: PCT/FR2014/052480
§ 371 (c)(1),
(2) Date: Sep. 7, 2016

(87) PCT Pub. No.: WO2015/079131
PCT Pub. Date: Jun. 4, 2015

(65) Prior Publication Data
US 2016/0377103 A1    Dec. 29, 2016

(30) Foreign Application Priority Data
Nov. 28, 2013 (FR) ..................... 13 61791

(51) Int. Cl.
*F16B 5/00* (2006.01)
*F16B 17/00* (2006.01)
(Continued)

(52) U.S. Cl.
CPC ............ *F16B 5/0016* (2013.01); *B60K 11/04* (2013.01); *F04D 29/541* (2013.01);
(Continued)

(58) Field of Classification Search
CPC ........ F16B 5/0016; F16B 5/00; F16B 5/0012; F16B 17/008; F16B 2240/12;
(Continued)

(56) References Cited

U.S. PATENT DOCUMENTS

| 2,266,593 A | 12/1941 | Emmons |
| 3,794,001 A * | 2/1974 | Birch .................. F01P 5/06 123/41.05 |

(Continued)

FOREIGN PATENT DOCUMENTS

| DE | 33 41 929 A1 | 5/1985 |
| DE | 296 23 095 U1 | 1/1998 |

OTHER PUBLICATIONS

International Search Report dated Jan. 19, 2015 in PCT/FR2014/052480 filed Sep. 30, 2014.
(Continued)

*Primary Examiner* — Kenneth J Hansen
*Assistant Examiner* — Justin A Pruitt
(74) *Attorney, Agent, or Firm* — Oblon, McClelland, Maier & Neustadt, L.L.P.

(57) ABSTRACT

An assembly of a first element with a second element includes an elongate thin lip belonging to the second element being inserted in an elongate narrow slot formed by three sides of an elongate flat plate fixed in parallel to a flat wall of the first element. At least one element forming a guide is secured to a long side of the elongate flat plate forming an edge of the slot. The element forming a guide includes a sliding surface extending in the continuation of the elongate flat plate and diverging from the flat wall away from the first element. The at least one element forming a guide cooperates with the lip so that the insertion of the lip into the slot begins with the sliding of the lip on the sliding (Continued)

surface and then continues as the lip advances, with progressive insertion of the lip into the slot.

6 Claims, 2 Drawing Sheets

(51) Int. Cl.
    *B60K 11/04*       (2006.01)
    *F04D 29/54*      (2006.01)
    *F04D 29/64*      (2006.01)
    *F04D 29/24*      (2006.01)

(52) U.S. Cl.
    CPC .......... *F04D 29/644* (2013.01); *F16B 17/008* (2013.01); *F01P 2070/50* (2013.01); *F05B 2240/123* (2013.01); *F05B 2240/20* (2013.01)

(58) Field of Classification Search
    CPC .. F16B 2240/20; F16B 5/0008; F16B 5/0084; B60K 11/04; B60K 11/08; F04D 29/541; F04D 29/644; F05B 2240/123; F05B 2240/20

USPC ...................................................... 416/169 A
See application file for complete search history.

(56) References Cited

U.S. PATENT DOCUMENTS

| | | | | |
|---|---|---|---|---|
| 5,623,893 A * | 4/1997 | Bartz | ........................ | F01P 5/06 |
| | | | | 123/41.49 |
| 5,699,601 A * | 12/1997 | Gilliam | ................... | B25B 27/00 |
| | | | | 29/278 |
| 6,021,753 A * | 2/2000 | Chaffin | ................... | B29C 65/04 |
| | | | | 123/184.61 |
| 2005/0214068 A1 | 9/2005 | Ito | | |
| 2008/0295438 A1* | 12/2008 | Knauseder | ............ | E04B 9/0435 |
| | | | | 52/589.1 |
| 2011/0017742 A1 | 1/2011 | Sausen et al. | | |

OTHER PUBLICATIONS

French Search Report dated Aug. 12, 2014 in Patent Application No. 1361791 filed Nov. 28, 2013.

* cited by examiner

ASSEMBLY WITH GUIDANCE OF AN ELONGATE THIN LIP IN AN ELONGATE NARROW SLOT AND APPLICATION TO THE ASSEMBLING OF AN AIR GUIDE ON A NOZZLE

BACKGROUND

The present invention relates to the assembly with guidance of a relatively thin elongate lip in a relatively narrow elongate slot and the application thereof to the assembling of an air guide on a nozzle.

In some applications it is necessary to fit one element inside the other, the first element having at least one wall terminated by a relatively thin elongate lip or tongue which has to be closely received in an elongate slot formed in the second element. This is the case, for example, in the field of motor vehicle construction when the upper and lower walls of an air guide are fitted onto a nozzle of a motor-fan unit; in the upper and lower parts the nozzle comprises horizontal parallel walls, parallel plates attached on one long side to the wall forming elongate slots thereon, said slots being of low thickness and open on three sides; the air guide comprises in the upper and lower parts two elongate lips having rectilinear edges which have to be inserted into the narrow parallel slots of the nozzle; subsequent to this fitting procedure, the air guide is finally fixed to the nozzle using appropriate complementary clipping elements. The insertion of one part into the other proves quite difficult for the fitter, due to the fact that the air guide is a relatively large and flexible part which is thus deformed when it is handled and thus it is not easy to place the areas which are to be clipped together correctly in correspondence. This placing in correspondence is particularly difficult in the lower part of the nozzle, which is not clearly visible to the fitter: thus the fitter has to carry out the mounting blind, which may prove complicated.

BRIEF SUMMARY

The object of the invention is to propose an assembly of a relatively thin elongate lip in a relatively narrow slot which is elongated on three sides, the insertion of one element into the other being facilitated thereby, in particular when the slot is not visible.

The invention achieves the object by means an assembly of a first element with a second element performed by assembling an elongate thin lip belonging to the second element in an elongate narrow slot formed by the three sides of an elongate flat plate fixed in parallel to a flat wall of the first element, characterized in that at least one element forming a guide is secured to a long side of said elongate flat plate forming an edge of the slot, said element forming a guide comprising a sliding surface which is arranged to cooperate with the lip so that the insertion of the lip into the slot begins with the sliding of the lip on the sliding surface and then continues as the lip advances, with the progressive insertion of the lip into the slot.

Advantageously, according to a first embodiment the sliding surface of an element forming a guide may be a flat surface forming a plane which is inclined relative to said elongate flat plate. In particular, the sliding surface may comprise laterally two areas of greater inclination than the inclination of said sliding surface. These areas may be, for example, corners of the sliding surface. These areas of greater inclination may permit the insertion of the lip to be facilitated, in particular when the lip comprises a concave edge in the direction of the first element and is terminated laterally by protruding points.

Advantageously, according to a second embodiment the sliding surface of an element forming a guide may be a surface having a curved cross section, i.e. this cross section is in the shape of a circular arc or ellipse or an approximate curve.

The assembly of the first element to the second element may comprise a single element forming a guide extending over the entire length of said slot or over substantially the entire length of said slot, for example over at least 70% of the length of this slot.

The assembly of the first element with the second element may alternatively comprise at least two separate elements forming a guide arranged along the slot. For example, two elements forming a guide may be arranged at the lateral ends of the slot or in the vicinity thereof. Further elements forming separate guides may be provided between these two elements forming a guide which are arranged laterally, for example distributed uniformly, relative to one another.

The number and dimensions of the elements forming a guide may be selected as a function of the space available in the surroundings of the slot and the stresses which they have to withstand during the insertion of the lip inside the slot, due to the sliding of this lip on the sliding surface thereof.

Advantageously and in a non-limiting manner, on a face opposing the slot, said flat wall may have at least one stop extending in the extension of a long edge of the slot substantially perpendicular to said flat wall, said stop being arranged so as to block the lip and prevent it from passing outside the slot. In this manner, the lip is blocked from moving forward and the fitter knows that he has to displace the lip to force it into the slot. Such a stop may extend over the entire depth of the slot.

Advantageously and in a non-limiting manner, the first element may comprise inside the slot a plurality of wedging ribs arranged perpendicular to the direction of insertion of the lip into the slot and perpendicular to the flat wall and to the flat plate, said wedging ribs being arranged so as to cooperate with the lip when it is inserted into the elongate slot so as to guide the lip to the back thereof and to wedge the lip perpendicular to the flat wall when said lip is fully inserted into the slot. These wedging ribs may be variously fixed to the flat wall or the elongate flat plate of the first element. However, fixing to the flat wall may permit the guidance of the lip at the back of the slot to be improved.

Advantageously, the elongate thin lip may have concave edge in the direction of the first element and may be terminated laterally by protruding points. This may permit the insertion of the lip inside the slot to be facilitated, in particular when an element forming a guide extends over the entire length of the slot or when the separate elements forming a guide are arranged laterally. The insertion of the lip in the slot begins by the insertion of the points in said areas of the slot comprising an element forming a guide and then continues as the lip advances, with the progressive insertion of the remainder of the concave edge of the lip.

Advantageously and in a non-limiting manner, the element(s) forming a guide are produced in one piece with the first element, for example by molding. However, it is conceivable to fax one or more elements forming a guide to the first element, for example by adhesive bonding. The same applies to the stops and/or the wedging ribs.

According to a preferred application, the assembly is the assembling of an air guide on a fan nozzle in a motor vehicle. Advantageously, the slot is arranged on a part of the fan nozzle which is not visible during mounting, in particular a lower part.

BRIEF DESCRIPTION OF THE DRAWINGS

Further features and advantages of the invention will be revealed from the following description of an exemplary embodiment. Reference will be made to the accompanying drawings, in which.

DETAILED DESCRIPTION

Figure 1:
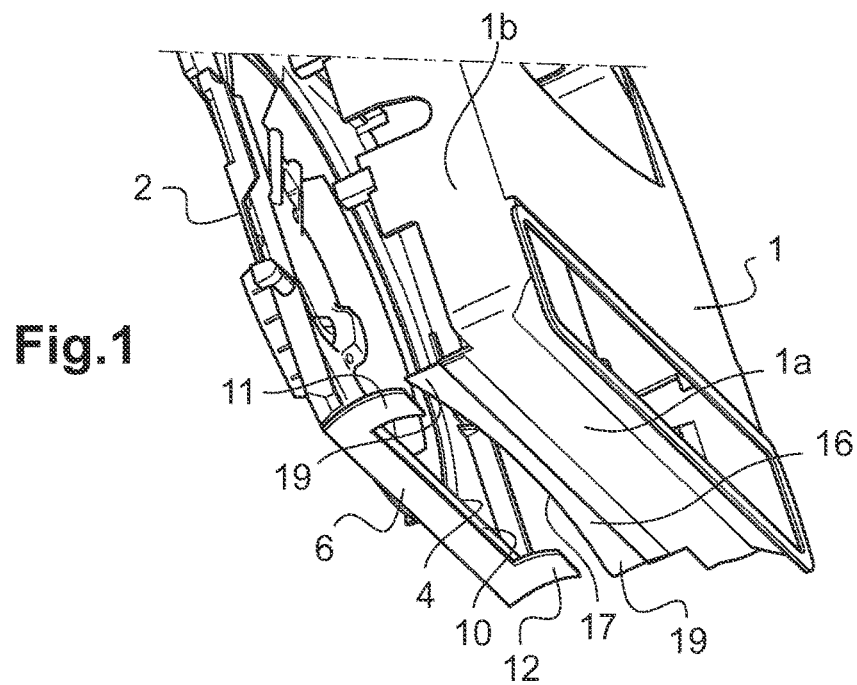
FIG. 1 is a partial view in perspective from below and from the front of the lower part of a fan nozzle and an air guide to be assembled with the nozzle, by being fitted therein, in the approach position.

The assembly according to the invention aims to fit an air guide 1 (second element) onto the nozzle 2 (first element) of a motor-fan unit.

The nozzle 2 is in the form of a rigid rectangular frame extending vertically and transversely to the front-rear longitudinal direction of the vehicle. This frame has, in particular, two horizontal walls, respectively upper and lower, only the horizontal lower wall 4 thereof being shown in the figures. On the lower wall 4, a parallel elongate rectangular plate 6 is attached to the wall 4 by a connecting foot 5 along the long side of the plate 6 (FIG. 2); the three other sides of the plate 6 (a further long side 8 and two short sides 9) form open edges of a horizontal slot 10 which is open to the front (i.e. toward the air guide 1) and laterally. The term "side" is understood here as a peripheral edge of the plate 6.

According to the invention, one or more elements forming a guide are fixed to the long side 8 of the plate 6. In the embodiment shown in FIGS. 1 to 3, two separate elements forming a guide 11, 12 are arranged laterally. They each respectively comprise a sliding surface 11a, 12a which extends in the extension of the plate 6, diverging from the wall 4 away from the nozzle 2. Thus, in FIGS. 1 to 3, the sliding surfaces 11a, 12a have a curved cross section. This curved cross section may, for example, be a circular arc, the radius thereof being, for example, 15 to 20 mm. For example, the end of an element forming a guide 11, 12 may be located, for example, at 10-20 mm from the edge of the long side 8, perpendicular to the plate 6 and located at 15-20 mm from the edge of this long side 8 parallel to the plate 6. Naturally, the dimensions could be adapted according to the space available.

The length of the elements forming a guide 11, 12, namely their dimension perpendicular to the long side 8 of the plate 6, could be variable, in particular depending on the surrounding space available. Thus, the elements forming a guide 11, 12 of FIG. 3 are shorter than those shown in FIG. 2.

Figure 4:
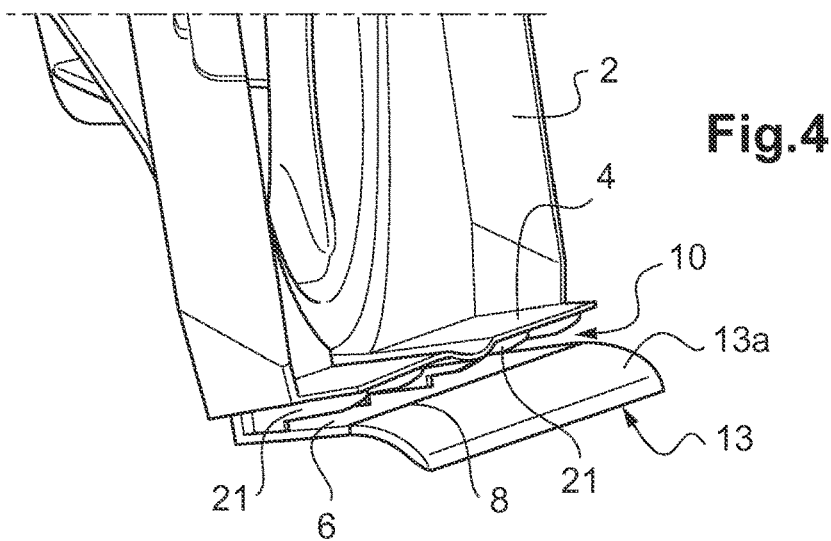
Figure 5:
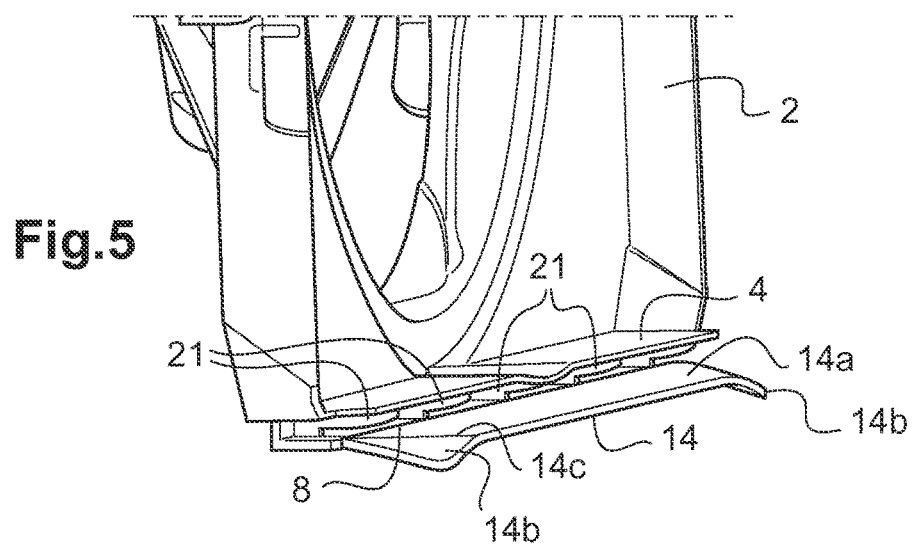
Figure 6:
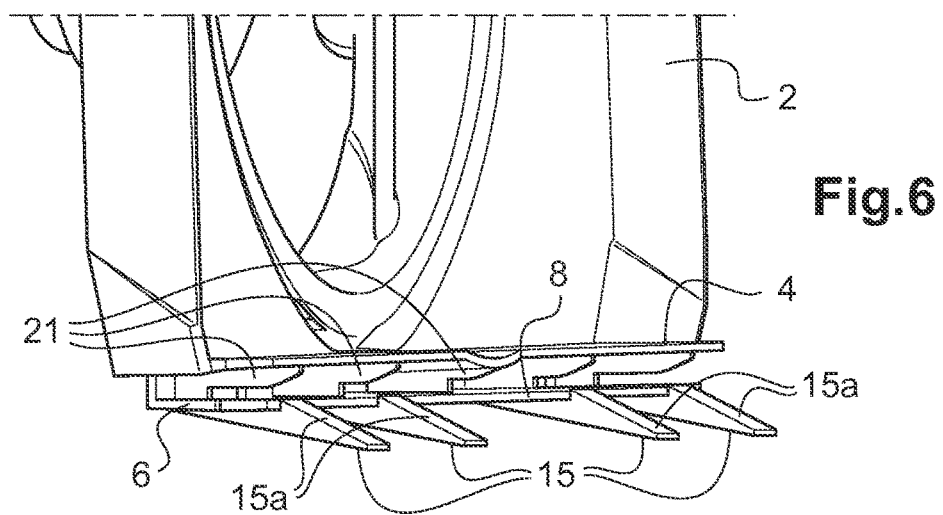

FIGS. 4 to 6 show variants of the elements forming a guide.

Thus the nozzle 2 of FIG. 4 comprises a single element forming a guide 13 which extends over the entire length of the long side 8 of the plate 6, in other words over the entire length of the slot 10. The cross section of this element forming a guide 13 is also curved such that its sliding surface 13a has a rounded shape. This curved cross section may be similar to that of sliding surfaces 11a, 12a of the previous embodiment.

The nozzle 2 of FIG. 5 also comprises a single element forming a guide 14 which extends over the entire length of the long side 8 of the plate 6 but this element forming a guide 14 is in the form of plate which is inclined relative to the plate 6. Its sliding surface 14a is thus an inclined flat surface which is separate from the nozzle 2. This inclination may be in the order of 30 to 60° relative to the plate 6. The end of the sliding surface 14a may be located at 15-25 mm from the long side 8 of the plate 6, parallel thereto.

In the example, the front corners 14b of the element forming a guide 14 are "turned down" i.e. folded down along a "fold" 14c arranged diagonally. Thus it is seen that the sliding surface 14a comprises laterally two areas 14b of greater inclination than the inclination of said sliding surface 14a.

The nozzle 2 of FIG. 6 comprises a plurality of separate elements forming a guide 15 distributed along the plate 6. These elements forming a guide 15 have a triangular shape and are fixed below the plate 6 such that their sliding surfaces 15a extend in the extension of the plate 6, along inclined planes diverging from the nozzle 2. This inclination may be similar to the inclination of the embodiment of FIG. 5. In the example, all of the sliding surfaces 15a have the same inclination but they could have a different inclination. For example, the sliding surfaces 15a of the elements forming a guide 15 located at the ends could have a greater inclination than the sliding surfaces 15a of the other elements forming a guide 15.

The sliding surfaces 11a-15a of the different embodiments thus have a hood shape.

This hood shape on one side of the slot 10 may be complemented by the presence of one or more stops 20 arranged on the other side of the slot 10, more specifically on one face of the wall 4 of the nozzle 2 opposing the slot 10. Each stop 20 is thus fixed to the wall 4 and comes into contact with the edge of this wall 4 substantially perpendicular thereto, from an edge of the opposing slot 10 with an edge bearing the element(s) forming a guide, namely from an edge of the slot 10 located opposite the long edge 8 of the plate 6. Each stop 20 thus forms locally a type of edge which blocks the passage of the lip 16 in order to prevent the lip from passing above the wall 4. These stops 20 have only been shown in FIGS. 2 and 3. In these figures, the stops are two in number and are arranged opposite the elements forming a guide 11 and 12. They extend over the entire depth of the slot. However, a single stop or more than two stops distributed along the slot 10 could be provided, and this applies to each of the embodiments shown in FIGS. 1 to 6. The stops 20 may be produced in a simple manner in the form of ribs, which are more or less long and of a few millimeters in height, for example 4 to 5 mm in height.

The air guide 1 is in the form of a rectangular frame essentially comprising upper and lower horizontal walls connected by vertical sides. In FIG. 1, only the lower wall 1a and a vertical side 1b are shown. The horizontal wall 1a is terminated to the rear by a rear lip 16 oriented toward the nozzle 2 and which has to be inserted relatively tightly into the slot 10 of the nozzle 2.

Figure 2:
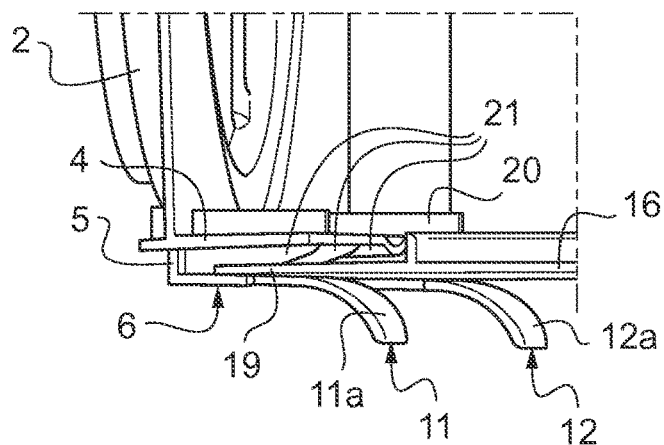
FIG. 2 is a detailed three-quarter front perspective view of the lower part of the nozzle and the air guide of FIG. 1 in the fitted position.
Figure 3:
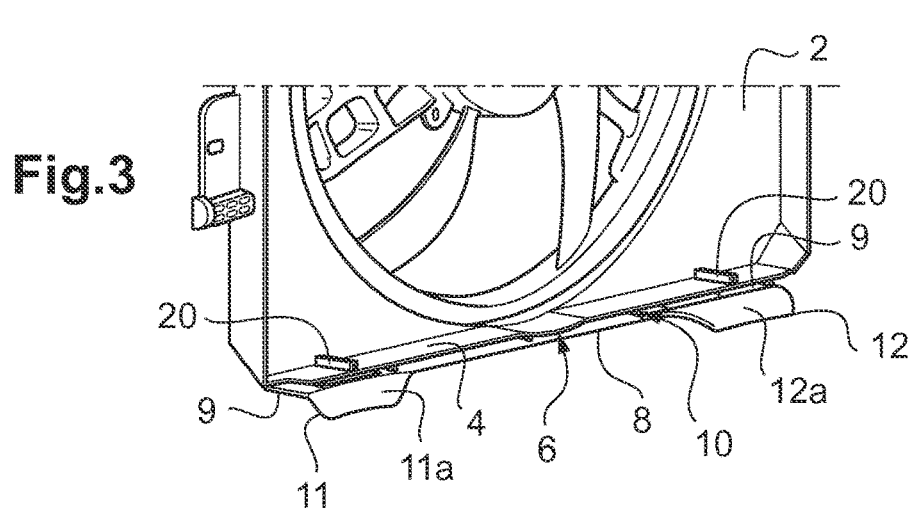
FIGS. 3 to 6 are detailed three-quarter front perspective views of the lower part of the nozzle of FIG. 1 according to different embodiments of the elements forming a guide.

In the embodiment shown in FIGS. 1 and 2, the rear lip 16 is curved and concave to the rear, such that it forms in the direction of the nozzle 2 an elliptical arc-shaped edge 17, terminated laterally by two protruding lateral points 19.

However, the invention is not limited to a curved shape 17 of the edge of the lip 16, this edge also being able to be rectilinear.

When the air guide 1 and the nozzle 2 are presented in front of one another (FIG. 1), the fitter places the points 19 of the curved edge 17 opposite the elements forming a guide 11, 12 of the nozzle, said elements cooperating with the lip 16 such that by continuing the movement of approaching one element toward the other, these points 19 may be brought to bear against the sliding surfaces 11a, 12a of the elements forming a guide 11, 12 and may be guided progressively by these surfaces toward the slot 10, the stops 20 preventing the lip 16 from passing above the wall 4 when it approaches the slot 10. At the same time, the curved shape of the edge 17 permits the remainder of the lip 16 to move forward progressively without difficulty, in order to be inserted into the slot 10.

A similar mounting may be carried out with an implementation of the element(s) forming a guide according to one of FIGS. 4 to 6. Thus, for example, for an element forming a guide 14 as shown in FIG. 5 and a lip 16 having a curved edge 17, the points 19 of the lip 16 firstly come to bear against the corners 14b of the element forming a guide 14. For an element forming a guide 15 according to FIG. 6, the points 19 of the lip 16 are firstly brought to bear against the sliding surfaces 15a of the lateral elements forming a guide 15.

For all of the embodiments described, it is thus observed that the element(s) forming a guide are arranged so as to cooperate with a lip having a curved or rectilinear edge, so that the insertion of the lip into the slot starts by the sliding of the lip (or a part of the lip) on the sliding surface and then continues as the lip advances, with the progressive insertion of the lip into the slot. Similarly, each stop 20 is arranged so as to block the lip 16 when it is inserted into the slot 10 in order to prevent it from passing outside the slot 10.

Finally, wedging ribs 21 may also be provided for improved retention of the lip 16 of the air guide 1 inside the slot 10, said wedging ribs being arranged perpendicular to the direction of insertion of the lip 16 into the slot 10 and perpendicular to the flat wall 4 and to the flat plate 4. These wedging ribs 21 are arranged so as to cooperate with the lip 16 when said lip is inserted into the slot 10 so as to guide said lip to the back thereof and to wedge said lip perpendicular to the flat wall 4 when it is fully inserted into the slot 10. The ribs also permit the rigidity of the assembly to be improved after the lip 16 has been fitted into the slot 10. These ribs 21 are visible in FIGS. 2 and 4 to 6. They are distributed over the length of the slot 10 and have a height which increases from the edge of the slot toward the back of the slot, providing guidance of the lip 16 inside the slot 16.

The upper parts of the two elements 1 and 2 may also be assembled by the cooperation of a lip with a slot. However, as the visibility is improved, the presence of elements forming a guide located in front of the slot is not necessary. Optionally, the external corners of the slot may be folded back to the outside of the slot so as to increase the thickness of the slot in the region of its ends and thus facilitate the insertion of protruding points of a lip.

The nozzle described above has the overall shape of a frame. In further embodiments of the invention, the nozzle may consist of a rigid structure having a substantially different shape from a frame but provided with similar guide means and slide means to those described above, at least on one of these peripheral edges.

The invention claimed is:

1. An assembly for a motor vehicle, comprising:
   a nozzle of a motor-fan unit including a rectangular frame comprised of upper and lower horizontal walls connected by vertical sides, the nozzle including an elongate narrow slot formed by three sides of an elongate flat plate, the elongate flat plate being fixed in parallel to and extending below the lower horizontal wall;
   an air guide including a rectangular frame comprised of upper and lower horizontal walls connected by vertical sides, the air guide including an elongate thin lip extending from a rear of the lower horizontal wall of the air guide, the lip being inserted into the slot to assemble the nozzle and the air guide; and
   a guide secured to a long side of said elongate flat plate,
   wherein said guide comprises a sliding surface attached to said elongate flat plate at a first end and extending from said elongate flat plate in a downward direction away from the nozzle and ending in a second end opposite to the first end, and
   wherein the sliding surface of the guide has a curved cross section that is convex from the first end to the second end of the sliding surface and that faces the elongate thin lip when the lip is positioned in the slot.

2. The assembly as claimed in claim 1, wherein the guide extends over substantially an entire length of said slot.

3. The assembly as claimed in claim 1, wherein the guide is comprised of at least two separate elements arranged along the slot.

4. The assembly as claimed in claim 1, wherein, on a face opposing the slot, said lower horizontal wall of the nozzle has at least one stop extending in an extension of a long edge of the slot substantially perpendicular to said lower horizontal wall of the nozzle, said stop being arranged so as to block the lip and to prevent the lip from passing outside the slot.

5. The assembly as claimed in claim 1, wherein the nozzle comprises a plurality of wedging ribs fixed to a bottom of the lower horizontal wall of the nozzle and arranged inside the slot and perpendicular to the direction of insertion of the lip into the slot and perpendicular to the lower horizontal wall of the nozzle and to the flat plate, said wedging ribs having a curved surface facing the lip so as to cooperate with the lip when the lip is inserted into the slot so as to guide the lip to the back thereof and to wedge the lip perpendicular to the lower horizontal wall of the nozzle when said lip is fully inserted into the slot.

6. The assembly as claimed in claim 1, wherein the elongate thin lip has a concave edge in the direction of the nozzle and is terminated laterally by protruding points.

* * * * *